United States Patent
Kim

(10) Patent No.: US 9,567,757 B2
(45) Date of Patent: Feb. 14, 2017

(54) LAMINATED FLOOR USING POLY LACTIC ACID RESIN

(71) Applicant: LG HAUSYS, LTD., Seoul (KR)

(72) Inventor: Gyu Yull Kim, Cheongju-si (KR)

(73) Assignee: LG Hausys, Ltd., Seoul (KR)

( * ) Notice: Subject to any disclaimer, the term of this patent is extended or adjusted under 35 U.S.C. 154(b) by 221 days.

(21) Appl. No.: 14/368,723

(22) PCT Filed: Dec. 28, 2012

(86) PCT No.: PCT/KR2012/011726
§ 371 (c)(1),
(2) Date: Jun. 25, 2014

(87) PCT Pub. No.: WO2013/103217
PCT Pub. Date: Jul. 11, 2013

(65) Prior Publication Data
US 2014/0377515 A1 Dec. 25, 2014

(30) Foreign Application Priority Data
Jan. 6, 2012 (KR) .......... 10-2012-0001829

(51) Int. Cl.
*B32B 3/10* (2006.01)
*E04F 15/10* (2006.01)
*B32B 21/14* (2006.01)
*B32B 27/36* (2006.01)
*B32B 21/02* (2006.01)

(52) U.S. Cl.
CPC ............ *E04F 15/107* (2013.01); *B32B 21/02* (2013.01); *B32B 21/14* (2013.01); *B32B 27/36* (2013.01); *E04F 15/105* (2013.01); *B32B 2250/05* (2013.01); *B32B 2317/16* (2013.01); *B32B 2333/04* (2013.01); *B32B 2471/00* (2013.01); *Y10T 428/24868* (2015.01)

(58) Field of Classification Search
None
See application file for complete search history.

(56) References Cited

U.S. PATENT DOCUMENTS 7,473,457 B2 * 1/2009 Han .................. B32B 21/02
428/167
2006/0157195 A1 7/2006 Laurence et al.

FOREIGN PATENT DOCUMENTS

EP 1533114 A2 5/2005
JP 2006-514187 A 4/2006
(Continued)

OTHER PUBLICATIONS

Machine translation of KR 1020110110062.*

*Primary Examiner* — Christopher Polley
(74) *Attorney, Agent, or Firm* — Dentons US LLP

(57) ABSTRACT

Disclosed is a laminated floor using a poly lactic acid (PLA) resin, of which a surface layer is formed of the PLA resin, thereby being environment-friendly and providing soft feeling and excellent workability. The laminated floor using a PLA resin, which is constructed on floor, includes a bottom layer formed of a HDF or MDF; and a surface layer comprising a reinforcement layer, a printed layer, a transparent layer and a surface treatment layer which are stacked on the bottom layer, wherein one or more of the reinforcement layer, the printed layer, the transparent layer and the surface treatment layer are formed of the PLA resin.

9 Claims, 2 Drawing Sheets

(56) References Cited

FOREIGN PATENT DOCUMENTS

| | | |
|---|---|---|
| KR | 20-0324825 A | 8/2003 |
| KR | 10-2011-0103806 A | 9/2011 |
| KR | 10-2011-0103895 A | 9/2011 |
| KR | 10-2011-0103896 A | 9/2011 |
| KR | 10-2011-0104132 A | 9/2011 |
| KR | 20-2011-0008983 U | 9/2011 |
| KR | 10-2011-0110062 A | 10/2011 |
| WO | 2004098881 A1 | 11/2004 |
| WO | 2009-120311 A2 | 10/2009 |
| WO | 2011/102615 A2 | 8/2011 |
| WO | 2011-115382 A2 | 9/2011 |

* cited by examiner

LAMINATED FLOOR USING POLY LACTIC ACID RESIN

This application is a National Stage Entry of International Application No. PCT/KR2012/011726, filed on Dec. 28, 2012, and claims priority to and benefit of Korean Application No. 10-2012-0001829, filed on Jan. 6, 2012, which are hereby incorporated by reference in its entirety for all purposes as if fully set forth herein.

TECHNICAL FIELD

The present invention relates to a laminated floor, and more particularly to a laminated floor using a poly lactic acid (PLA) resin, of which a surface layer is formed of the PLA resin, thereby being environment-friendly and providing soft feeling and excellent workability.

BACKGROUND ART

Generally, the laminate floor is a product in which desired patterns or designs such as wood pattern, marble pattern and other shapes are precisely printed on a laminated floor (HDF) and then an anti-wear film is attached and pressed thereon.

The laminate floor uses as a base material the plate type HDF which is manufactured by collecting fibers from wood, adding a water-proof resin therein and then pressing the mixture with high pressure. A surface of the HDF is reinforced with HPL (high-pressure laminate) or LPL (low-pressure laminate). Due to the laminating, the laminate floor has high wear resistance, durability and anti-contamination property.

However, such conventional laminate floor has some advantages in the bottom layer but also has disadvantages in the surface layer. In other words, as shown in FIG. 1, a printed layer 14 and a melamine-faced overlay sheet layer are stacked on a HDF layer as the bottom layer 12, and a balance layer 18 is pressed on a lower surface of the bottom layer 12. Therefore, the laminate floor has the stronger surface than the hypocaust floor formed of water-proof plywood, but it is sensitive to moisture due to the use of the thermosetting melamine resin as the surface material.

Further, since its surface has brittle property, a user may have a freezing feeling. And if a sharp object or a heavy object is fallen thereon, the collided spot may be broken or damaged. Further, natural texture of the printed patterns or designs is very poor, compared to the hypocaust floor formed of water-proof plywood.

DISCLOSURE OF INVENTION

Technical Problem

An object of the present invention is to provide a flooring material using a PLA resin, in which a surface layer attached on a bottom layer formed of HDF or MDF is formed of a natural resin, i.e., the PLA resin, thereby improving the natural texture.

Another object of the present invention is to provide a flooring material which has advantages of the bottom layer formed of HDF or MDF having high wear resistance, durability, anti-contamination property and excellent workability and also has advantages of the PLA resin which can minimize emission of harmful substances upon the discarding of it, thereby preventing secondary environmental contamination.

Yet another object of the present invention is to provide a flooring material which is resistant to moisture and has a natural printed layer and also which can be easily constructed and facilely manufactured.

Solution to Problem

To achieve the object of the present invention, the present invention provides a laminated floor using a poly lactic acid (PLA) resin, which is constructed on floor, including a bottom layer formed of a HDF or MDF; and a surface layer comprising a reinforcement layer, a printed layer, a transparent layer and a surface treatment layer which are stacked on the bottom layer, wherein one or more of the reinforcement layer, the printed layer, the transparent layer and the surface treatment layer are formed of the PLA resin.

Further, an adhesive layer is provided between the bottom layer and the surface layer, and one of the reinforcement layer and the transparent layer of the surface layer is formed of PLA.

Advantageous Effects of Invention

According to the present invention, since the bottom layer is formed of the HDF or MDF, it is possible to provide high wear resistance, durability, anti-contamination property and excellent workability and also provide the natural texture to the surface layer.

Further, the present invention uses the PLA resin, and thus the emission of harmful substances is reduced, thereby preventing secondary environmental contamination, improving the surface strength and providing soft feeling and reducing noise between floors.

BRIEF DESCRIPTION OF DRAWINGS

The above and other objects, features and advantages of the present invention will become apparent from the following description of preferred embodiments given in conjunction with the accompany drawings, in which.

DETAILED DESCRIPTION OF MAIN ELEMENTS

Figure 1:
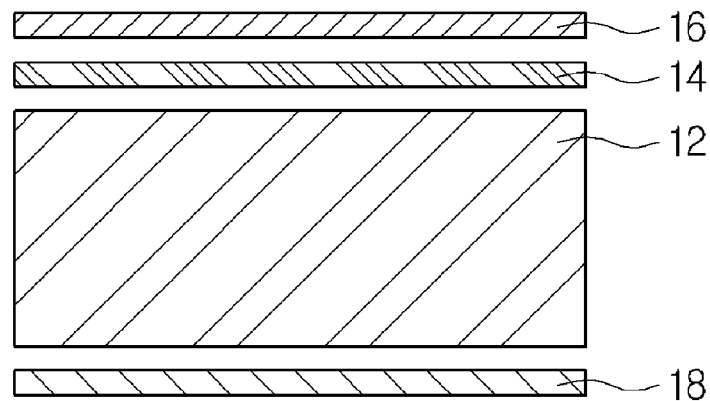
FIG. 1 is a cross-sectional view of a conventional laminate floor.

10: flooring material 100: bottom layer
200: surface layer 210: reinforcement layer
220: printed layer 230: transparent layer
240: surface treatment layer

BEST MODE FOR CARRYING OUT THE INVENTION

Hereinafter, the embodiments of the present invention will be described in detail with reference to accompanying drawings.

Figure 2:
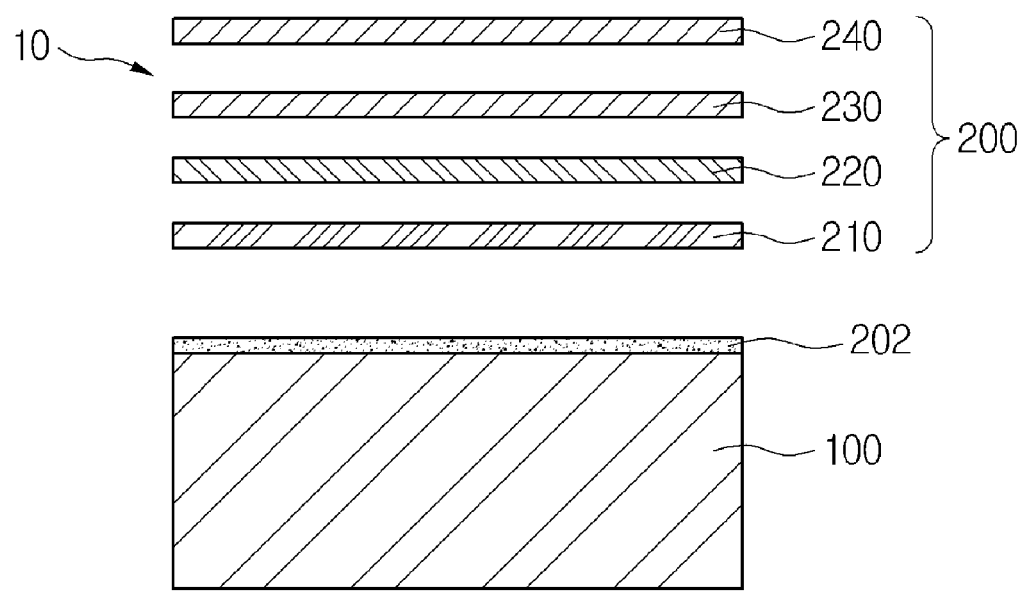
FIG. 2 is an exploded cross-sectional view of a flooring material according to the present invention.
Figure 3:
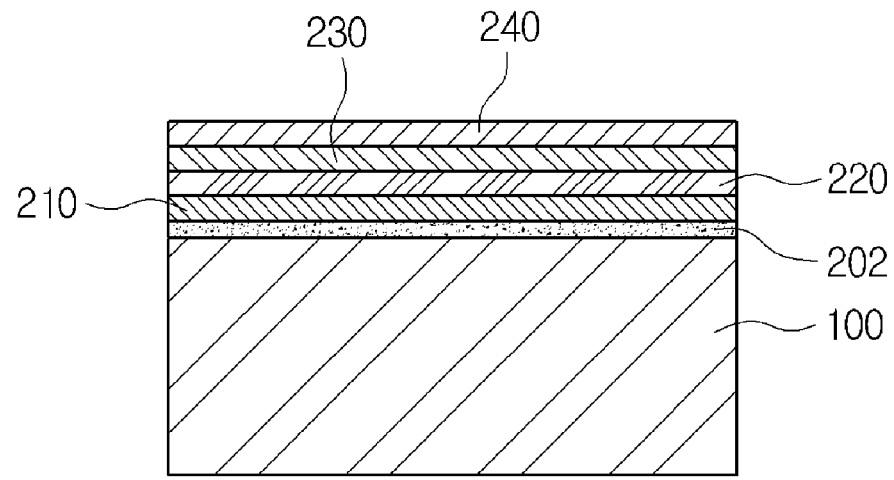
FIG. 3 is a cross-sectional view of the flooring material according to the present invention.
Figure 4:
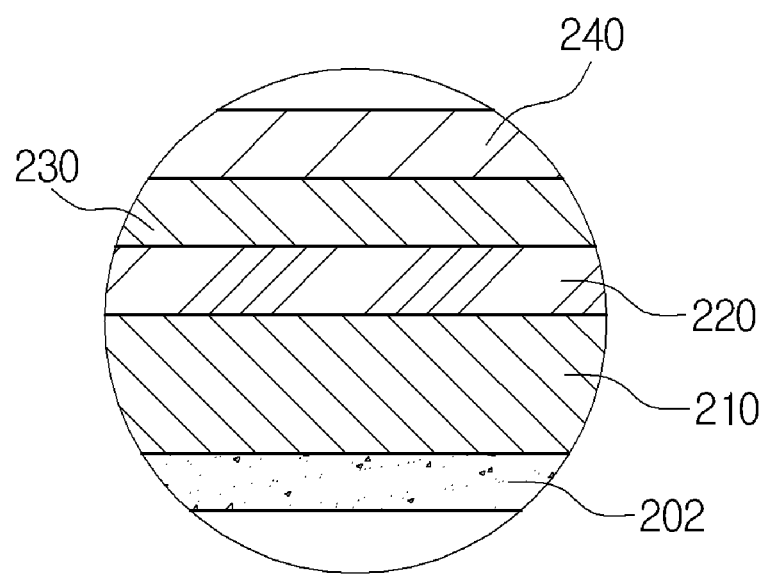
FIG. 4 is a partially enlarged cross-sectional view of the flooring material according to the present invention.

Firstly, FIG. 2 is an exploded cross-sectional view of a flooring material according to the present invention, FIG. 3 is a cross-sectional view of the flooring material according to the present invention, and FIG. 4 is a partially enlarged cross-sectional view of the flooring material according to the present invention.

In the drawings, a laminate floor 10 according to the present invention uses a bottom layer 100 formed of a HDF (laminated floor) or MDF (middle density fiberboard). A surface layer 200 is stacked on the bottom layer 100, and the surface layer 200 includes a reinforcement layer 210, a printed layer 220, a transparent layer 230, a surface treatment layer 240. The reinforcement layer 210 and the transparent layer 230 are formed of a PLA resin, and a hardener containing the PLA resin may be used as the surface treatment layer.

Further, an adhesive layer 202 formed of a melamine resin is provided between the reinforcement layer 210 and the bottom layer 100.

The bottom layer 100 is formed of the MDF or HDF which is manufactured by mixing glue with hardwood powder and then pressing the mixture into a board like plywood.

In the MDF, since the fiber is uniformly distributed over the whole thickness so as to form dense tissue, it is possible to perform a complicate machining work without rupture of a surface or side surface thereof. Further, due to its strong and flat surface, a decoration film, a veneer or the like may be overlayed thereon, and it is also facile to carry out a painting operation. Furthermore, due to its excellent stability, machinability and high strength, the MDF can be used in a drawer, a cabinet rail, a mirror frame and a flooring material.

The HDF having a high density of 900 kg/m$^3$ which has a far higher strength than the MDF. Therefore, the HDF is widely used as a substitute for plywood and also used as a furniture material and a laminate floor.

Further, the PLA resin forming the surface layer of the present invention, which is a thermoplastic polyester resin of lactide or lactic acid, can be manufactured by polymerzing lactic acid prepared by fermenting starch extracted from corn or potatoes and the like.

Since the PLA resin can be recycled repeatedly, it is possible to solve the problems occurred by the exhaustion of resources, and emission of environmental pollutants is smaller than in other resins, e.g., polyvinyl chloride, and also it can be decomposed rapidly upon the discarding thereof.

The PLA resin can be classified into a crystalline PLA (c-PLA) resin and an amorphous PLA (a-PLA) resin. In case of the crystalline PLA resin, the bleeding that a plasticizer is flowed out onto a sheet surface may occur, and thus the amorphous PLA resin is used in the present invention.

When using the amorphous PLA resin, it is preferable to use 100% amorphous PLA resin. If necessary, a mixture of the crystalline PLA resin and the amorphous PLA resin may be used.

In the molding process of the PLA resin, a non-phthalate plasticizer or a filler for reinforcing melt strength may contain acrylic copolymer, calcium carbonate, silica gel or titanium oxide can be included.

Typically, a plasticizer is an additive which is used to provide desired physical properties such as workability and flexibility according to its application, and particularly, the present invention uses the non-phthalate plasticizer which is not harmless to the human body.

When forming the reinforcement layer 210 and the transparent layer 230, one or more of a lubricant, a chain extender, a hydrolysis stabilizer or the like may be further added to the PLA resin.

Herein, the lubricant includes hydrocarbon, polyethylene, silicon fluid and environmental-friendly higher fatty acid such as stearic acid having 18 carbon atoms.

Carbodiimide, oxazoline or polycarbodiimide may be used as the hydrolysis stabilizer.

That is, it is preferable in the reinforcement layer 210 and the transparent layer 230 that 10 to 80 parts by weight of the non-phthalate plasticizer is used with respect to 100 parts by weight of the PLA resin, 1 to 20 parts by weight of the calcium carbonate, silica gel or titanium oxide, acrylic copolymer as the filler is used with respect to 100 parts by weight of the PLA resin, and 0.01 to 10 parts by weight of lubricant is used with respect to 100 parts by weight of the PLA resin.

Further, 0.01 to 10 parts by weight of the chain extender and hydrolysis stabilizer may be used with respect to 100 parts by weight of the PLA resin.

Preferably, the bottom layer 100 is formed to have a thickness of 2 to 7 mm, and the reinforcement layer 210 is formed to have a thickness of 0.01 to 2 mm, and the printed layer 220, the transparent layer 230 and the surface treatment layer 240 are respectively formed to have a thickness of 0.01 to 1 mm, respectively.

A thermosetting melamine resin may be used as the adhesive layer 202 which adheres the bottom layer 100 and the surface layer 200. Preferably, a spread amount of the melamine resin is 150 g/m$^2$.

Further, a thermosetting or UV curable composition is used as the surface treatment layer, and 0.1 to 20 parts by weight of silica, clay mineral, ceramic or the like may be further contained with respect to 100 parts by weight of the composition and the composition can be included PLA resin.

Meanwhile, the printed layer 220 may be formed through various method such as gravure printing, rotary printing and transfer printing.

As described above, the flooring material is formed of one of the HDF and MDF, and the surface layer 200 formed of the PLA resin is pressed on the bottom layer 100 using pressing rollers which are continuously arranged.

EMBODIMENT

The bottom layer 100 formed of the MDF is moved to a base, and 150 g/m$^2$ of the adhesive of melamine resin is coated on the bottom layer 100, thereby forming the adhesive layer 202.

The reinforcement layer 210 disposed on the adhesive layer 202 is formed by mixing 20 parts by weight of the non-phthalate plasticizer, 5 parts by weight of the acrylic copolymer, 0.03 parts by weight of the stearic acid, 0.01 parts by weight of the chain extender and 0.02 parts by weight of the carbodiimide with respect to 100 parts by weight of the PLA resin, and then pressing the mixture with the pressing rollers which are continuously arranged.

The printed layer 220 on the reinforcement layer is formed by the gravure printing. The transparent layer 230 is formed by mixing 30 parts by weight of the non-phthalate plasticizer, 3 parts by weight of the calcium carbonate, 9 parts by weight of the titanium oxide, 0.03 parts by weight of the stearic acid, 0.01 parts by weight of the chain extender and 0.02 parts by weight of carboniimide with respect to 100 parts by weight of the PLA resin and then pressing the mixture with rollers which are continuously arranged.

Meanwhile, the surface treatment layer 240 formed by coating the UV curable composition, i.e., UV curable urethane acrylate composition on the transparent layer 230.

INDUSTRIAL APPLICABILITY

As described above, since the bottom layer is formed of the HDF or MDF, it is possible to provide high wear resistance, durability, anti-contamination property and excellent workability and also provide the natural texture to the surface layer.

Further, the PLA resin is used in the present invention, and thus the emission of harmful substances is reduced, thereby preventing secondary environmental contamination, improving the surface strength and providing soft feeling.

While the present invention has been described with respect to the specific embodiments, it will be apparent to those skilled in the art that various changes and modifications may be made without departing from the spirit and scope of the invention as defined in the following claims.

The invention claimed is:

1. A laminated floor using a poly lactic acid (PLA) resin, which is constructed on floor, comprising:
   a bottom layer formed of a HDF or MDF; and
   a surface layer comprising a reinforcement layer, a printed layer, a transparent layer and a surface treatment layer which are stacked on the bottom layer,
   wherein the reinforcement layer and the transparent layer are formed of the PLA resin, and
   wherein the PLA resin is 100% amorphous PLA resin.

2. The laminated floor according to claim 1, wherein an adhesive layer of a thermosetting melamine resin is coated on the bottom layer.

3. The laminated floor according to claim 1, wherein one or more of a non-phthalate plasticizer, a filler, a lubricant, a chain extender, or a hydrolysis stabilizer is added to the PLA resin forming the reinforcement layer and the transparent layer.

4. The laminated floor according to claim 1, wherein the reinforcement layer and the transparent layer contain 10 to 80 parts by weight of non-phthalate plasticizer and 2 to 30 parts by weight of filler with respect to 100 parts by weight of the PLA resin.

5. The laminated floor according to claim 4, wherein the reinforcement layer and the transparent layer are manufactured by mixing 2 to 30 parts by weight of the filler, 0.01 to 10 parts by weight of the lubricant, 0.01 to 5 parts by weight of the chain extender and 0.01 to 10 parts by weight of the hydrolysis stabilizer and then pressing the mixture with the pressing rollers.

6. The laminated floor according to claim 4, wherein the reinforcement layer contains 20 parts by weight of the non-phthalate plasticizer, 5 parts by weight of the acrylic copolymer, 0.03 parts by weight of the stearic acid, 0.01 parts by weight of the chain extender and 0.02 parts by weight of the carbodiimide with respect to 100 parts by weight of the PLA resin.

7. The laminated floor according to claim 4, wherein the transparent layer contains 30 parts by weight of the non-phthalate plasticizer, 3 parts by weight of the calcium carbonate, 9 parts by weight of the titanium oxide, 0.03 parts by weight of the stearic acid, 0.01 parts by weight of the chain extender and 0.02 parts by weight of carboniimide with respect to 100 parts by weight of the PLA resin.

8. The laminated floor according to claim 5, wherein the reinforcement layer contains 20 parts by weight of the non-phthalate plasticizer, 5 parts by weight of the acrylic copolymer, 0.03 parts by weight of the stearic acid, 0.01 parts by weight of the chain extender and 0.02 parts by weight of the carbodiimide with respect to 100 parts by weight of the PLA resin.

9. The laminated floor according to claim 5, wherein the transparent layer contains 30 parts by weight of the non-phthalate plasticizer, 3 parts by weight of the calcium carbonate, 9 parts by weight of the titanium oxide, 0.03 parts by weight of the stearic acid, 0.01 parts by weight of the chain extender and 0.02 parts by weight of carboniimide with respect to 100 parts by weight of the PLA resin.

* * * * *